(12) United States Patent
Hall (10) Patent No.: US 6,432,346 B1
(45) Date of Patent: Aug. 13, 2002

(54) PROCESS OF MAKING MAGNETIC RECORDING DISK

(75) Inventor: David L. Hall, Salt Lake City, UT (US)

(73) Assignee: Iomega Corporation, UT (US)

( * ) Notice: Subject to any disclaimer, the term of this patent is extended or adjusted under 35 U.S.C. 154(b) by 0 days.

(21) Appl. No.: 09/564,103

(22) Filed: May 3, 2000

(51) Int. Cl.[7] .................. B29C 43/02; B29C 59/02; G11B 5/845
(52) U.S. Cl. .................. 264/427; 264/101; 264/293; 264/310; 264/320
(58) Field of Search ................ 264/101, 293, 264/310, 320, 427

(56) References Cited

U.S. PATENT DOCUMENTS

| | | | |
|---|---|---|---|
| 3,158,670 A | * 11/1964 | Camras | 264/293 |
| 4,537,833 A | 8/1985 | Kasuga et al. | |
| 4,555,443 A | * 11/1985 | Kikugawa et al. | 428/336 |
| 4,860,276 A | 8/1989 | Ukita et al. | |
| 4,874,633 A | 10/1989 | Komatsu et al. | |
| 4,935,835 A | 6/1990 | Godwin et al. | |
| 4,958,245 A | 9/1990 | Roth et al. | |
| 5,067,039 A | 11/1991 | Godwin et al. | |
| 5,535,069 A | 7/1996 | Chiao et al. | |
| 5,625,617 A | 4/1997 | Hopkins et al. | |
| 5,804,283 A | 9/1998 | Inaba et al. | |
| 5,851,622 A | 12/1998 | Ejiri et al. | |
| 6,033,760 A | * 3/2000 | Wakana et al. | 428/141 |

FOREIGN PATENT DOCUMENTS

| | | | |
|---|---|---|---|
| JP | 63259822 A | * 10/1988 | 428/694 SL |
| JP | 03032577 A | * 2/1991 | |

OTHER PUBLICATIONS

Embossed Servo Techniques for Floppy Disks by D.A. Thompson, R.E. Acosta, DW. Gilligan, G.L. Hutchins, S. Krongelb and L.T. Romankiw, Institution of Electronic and Radio Engineers—Proceedings of the Conference on Video and Data Recording, pp. 321–327 ( Jul. 1979).

Floppy Disc Embossing for Servo Applications by R.E. Acosta, G.L. Hutchins, A.T. Pfeiffer, L.T. Romankiw and D.A. Thompson, IBM Technical Disclosure Bulletin, vol. 21, No. 10, Mar. 1979 pp. 4259–4260.

* cited by examiner

Primary Examiner—Leo B. Tentoni
(74) Attorney, Agent, or Firm—Woodcock Washburn LLP (57) ABSTRACT

A method of producing magnetic recording disks includes positioning the disks between flat plates and increasing the temperature and pressure on the disks. Servo tracks are embossed on the disks by an embossing pattern on the flat plate. Servo tracks may be applied by a printing pattern on the flat plates. The flat plates are rotated during the process to relieve directional differences in the modulus of elasticity of the disk.

10 Claims, 7 Drawing Sheets

PROCESS OF MAKING MAGNETIC RECORDING DISK

FIELD OF THE INVENTION

This invention relates to the production of magnetic recording disks and more particularly to a method of smoothing the media to increase the recording capacity of the flexible disk.

BACKGROUND OF THE INVENTION

U.S. Pat. Nos. 4,874,633 Kasaga et al., 5,804,283 Inaba et al., and 5,851,622 Ejiri et al. relate to a method of producing magnetic recording media used by Fuji Photo Film Co. This process is often referred to as a "wet on wet" process. For the typically flexible high density media, the substrate is between 30 and 60 microns thick and has bumps which facilitate the unrolling of the film. The bumps may be one or two microns tall. A planarizing layer is applied to the substrate to cover most of these rough spots. Then the magnetic layer is applied which has particles and binders. One of the last steps in the process is to pass the web of media through rolls in a calendaring process which flattens the web of media. In some instances an attempt is made to burnish the media. However, it is well known that even with calendaring and burnishing the media still has bumps which are quite large in the scale of magnetic recording wherein disparities in the range of 30 nanometers or larger present a problem. If a magnetic recording head hits the disparity this causes the head to ride over the disparity and causes spacing loss preventing effective recording on some areas oft he material.

A continuously running web of media is cut into disks which are referred to as "cookies." The "cookies" cut from the web material are made into flexible magnetic recording disks used in cartridges for flexible media magnetic recording systems such as the ZIP and Clik! storage systems made by Iomega corporation. These recording systems have increasingly higher data capacities. The higher density recording requires an exceptionally smooth recording system.

One of the critical processes in making the cookies into disks for high capacity recording cartridges is laying down servo tracks on the media. This is typically performed by a very expensive machine that has exceptionally good positional accuracy. The machine writes the servo on the information medium by magnetic recording. This takes as long as six to eight minutes. Steps have been taken to spin the disk faster so that the write operation will take less time, but still it is a very expensive procedure to servo write a flexible disk. It has been suggested to print the servo track or stamp the servo track. This is often referred to as "embossed servo". Embossed servo techniques are described in the following references: IBM TDB vol. 21, No. 10, "Floppy Disc Embossing for Servo Applications," Acosta et al., 3/79 pp.4259–4260; "Embossed Servo Techniques for Floppy Discs", Thompson, et al., 1979, pp. 321–327; U.S. Pat. No. 4,935,835, Goodwin, et al., 4,958,425, Roth, et al.; 5,067,039 Godwin, et al.; 5,535,069, Chiao, et al.

It is an object of the present invention to smooth or flatten recording media for increased capacity flexible disk magnetic recording systems.

SUMMARY OF THE INVENTION

In accordance with the invention a magnetic recording disk is smoothed by positioning the disk between flat plates and increasing the temperature and pressure on the disk. Pressure is increased until the pressure approaches the yield strength of the substrate of the disk. Temperature is increased to above the glass transition temperature of the substrate, thereby allowing local deformation with low residual stress.

Further in accordance with the invention, one of the flat polished plates may be engraved with a servo pattern. When the disk is pressed between the flat plates, servo tracks are embossed on the media. The plates compress the media locally and plastically deform it. The disk is then passed through a magnetic field. The spacing over the embossed holes is so great that there is no magnetic signal in selected areas. This produces a magnetic servo track in an efficient manner.

The foregoing and other objects, features and advantages of the invention will be better understood from the following more detailed description and appended claims.

DESCRIPTION OF THE PREFERRED EMBODIMENT

Figure 1:
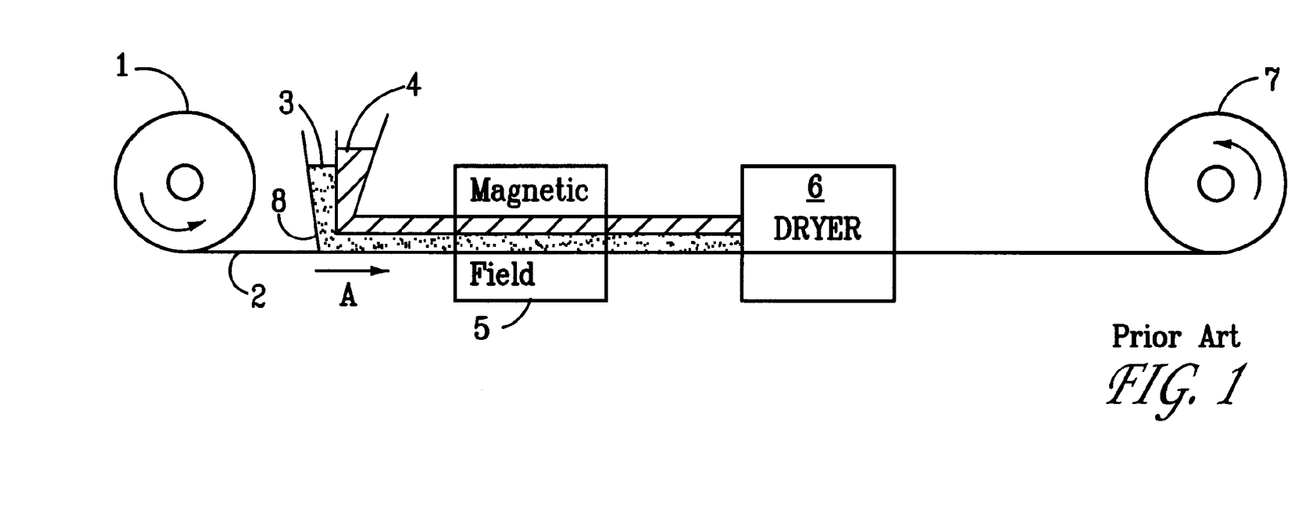
FIGS. 1 and 1A depict a prior art technique of making cookies which can be used in flexible media high capacity magnetic disk cartridges.
Figure 1A:
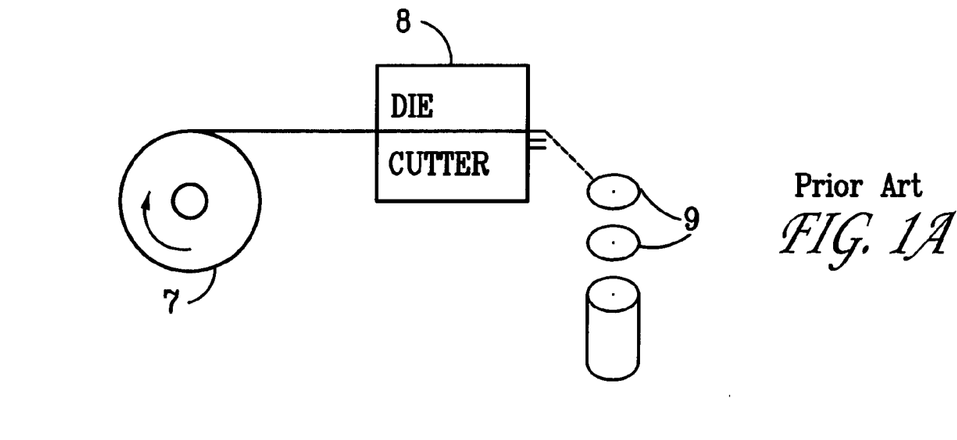

FIGS. 1 and 1A depict the prior art technique of making cookies for high capacity magnetic disk cartridges. An elongated belt-like non-magnetic support substrate 2 wound on a feed roller 1 is continuously fed in the direction of arrow A and taken up by a take-up roller 7. In close proximity to where the substrate is being fed a multi-layer simultaneous application device 8 is arranged to apply an undercoating forming liquid 3 and a magnetic film forming liquid 4 at the same time onto the surface of the non-magnetic substrate 2 to thereby form a multi-layer structure. Application of a magnetic field at 5 performs orientation or randomization of orientation of the particles. A dryer 6 dries the web of material which hardens into a sheet-like magnetic recording medium which is wound on the take up reel 7. The web of material is typically about a meter wide and four or five thousand meters long. The typical high density flexible media is between 30 and 60 microns thick and has bumps as previously discussed. Both sides of the substrate are typically coated before being punched into cookies. The reel 7 of material is unwound into a die cuter 8 which cuts the web of material into the cookies 9.

Figure 2:
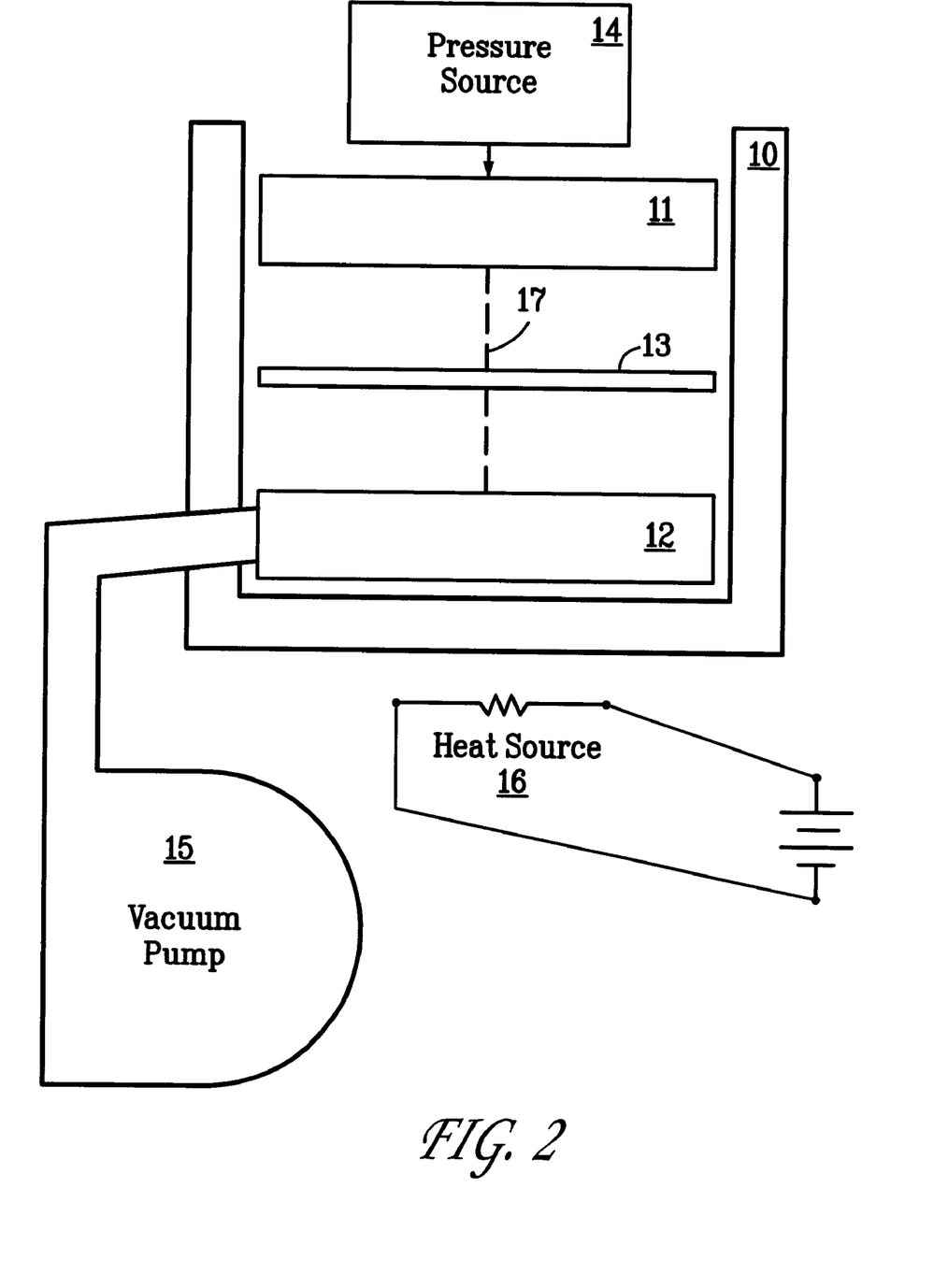
FIG. 2 shows a press which can be used in practicing the invention.

In accordance with the present invention these cookies are smoothed and flattened in the press shown in FIG. 2. The press includes a cylinder 10 with two opposed, highly polished flat plates 11 and 12. The cookie 13 is placed between plates 11 and 12. Air between the plates is removed by the vacuum pump 15. Pressure is applied by the pressure source 14 to, for example, 7500 psi. The temperature is raised by the heat source 16 to a temperature of 100° C., for example. The temperature is then lowered to ambient, the pressure is released and air is allowed to reenter the cylinder 1.

The super polished flat plates 11 and 12 have a surface which is flat within nanometers on either side. The disk is elastically compressed. It goes through a plastic deformation where it needs to, that is where the stress is high because there were extending areas or bumps. The temperature and pressure required depends upon the substrate. Two typical substrates are PET, polyethylene terephthalate or PEN. The PET goes through the deformation process at a lower temperature and this substrate is typically used in ZIP cartridges.

Figure 2A:
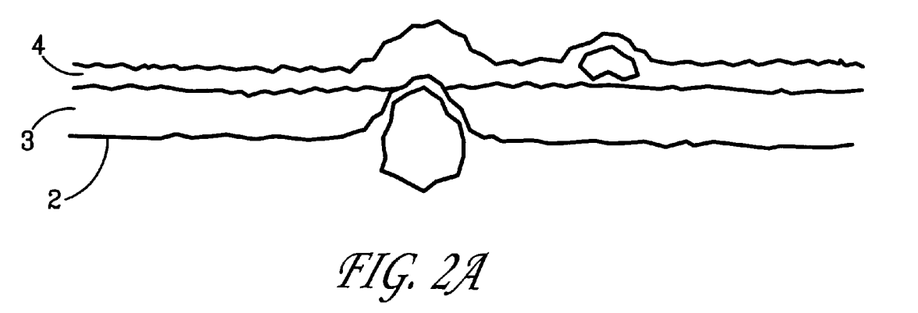
FIGS. 2A and 2B depict disparity in the media before and after the smoothing process of the present invention.
Figure 2B:
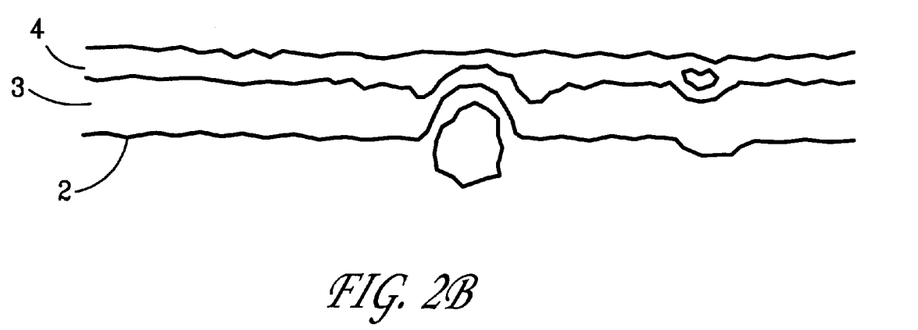

FIG. 2A depicts a typical asperity in the substrate and another, smaller, asperity in the magnetic layer. Increasing the pressure of the flat plates smashes the asperity so that the surface of magnetic layer 4 is flat and smooth as shown in FIG. 2B.

During the process of making the web from which the cookies are cut, it is stretched sideways and lengthwise. The cookie ends up with properties that depend on which direction it came out of the web. That is, its modulus of elasticity is different across the web, than lengthwise. Its shrink weight is different in different directions. Because the cookies are used in a rotating disk application it is desirable to have substrates with balanced properties that have the same moduli of elasticity in both directions. Otherwise, when a servo track is written on the cookie it may be round when the track is written, but if the substrate shrinks the track becomes elliptical or worse. In order to obviate the differences in moduli of elasticity in the cookie, the plates 11 and 12 are rotated one with respect to the other about their axis 17 during the time that the cookie is under pressure and at elevated temperature.

Figure 3:
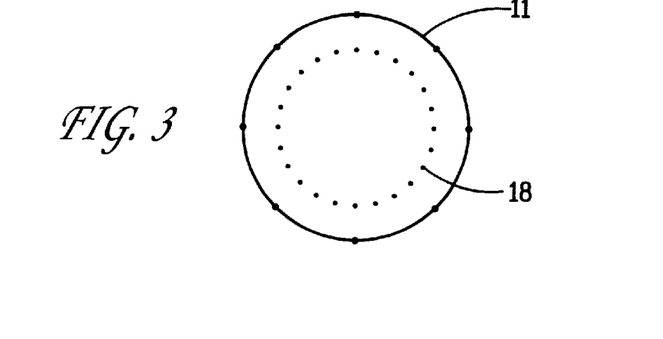
FIG. 3 depicts one of the flat plates in the press which has a servo track pattern thereon.

For embossed servo at least one of the plates has a servo pattern thereon. The pattern may be engraved or made in some other manner so that it deforms the media during the pressing operation. FIG. 3 depicts the flat plate 11 which has a servo track pattern 18 engraved thereon. While the cookie is under heat and pressure, the plates are rotated to relieve directional variations in modulus of elasticity as discussed above. Then, the plates remain stationary with the cookie under pressure and temperature until a servo pattern is embossed onto the cookie by the pattern 18. As an alternative to embossing the servo pattern, the servo pattern may be printed on the disks by the plates during the process of the present invention. If the engraved pattern on the plate is coated with a magnetic material, which is like an ink, the material is printed onto the disk when the plates are brought together.

Figure 4:
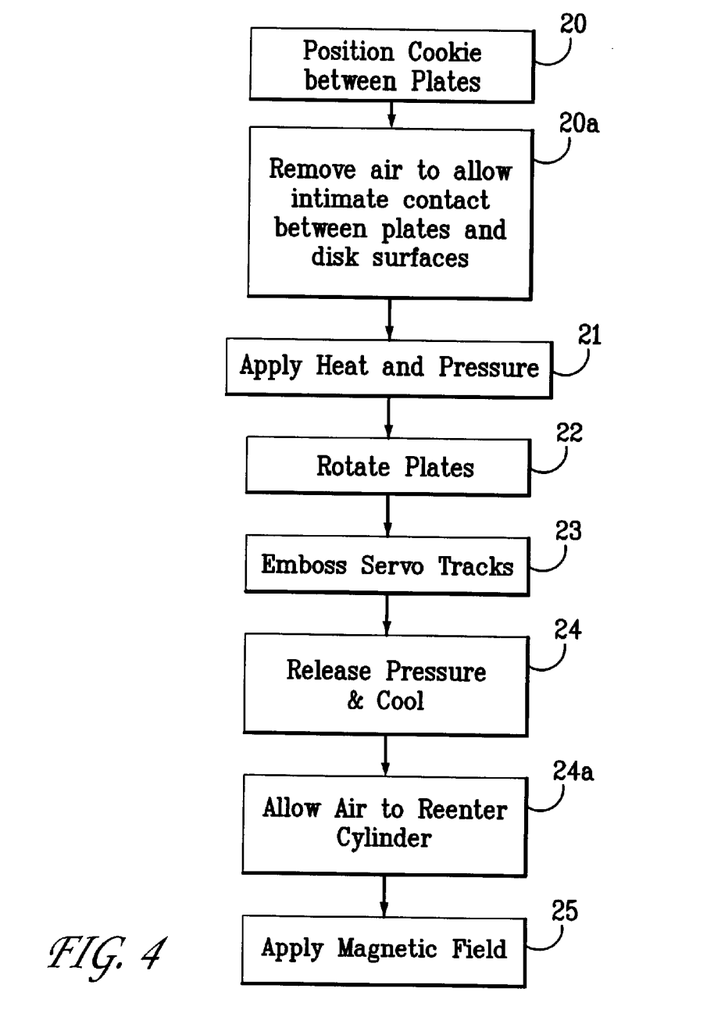
FIG. 4 is a flow chart depicting all of the steps which may be preformed in the process of the present invention.

FIG. 4 is a flow chart depicting all of the steps which may be performed in accordance with the present invention. Certain, or all of the steps of FIG. 4 may be advantageously used to produce magnetic storage disks having improved capacity.

In step 20 the cookie is positioned between the plates of a press. In step 20 a air is removed by vacuum pump 15 to allow intimate contact between the plate and the and the surface of the disk. In step 21 heat and pressure are applied. The plates are rotated in step 22 to relieve directional differences in the modulus of elasticity. A servo pattern is embossed on the disk in step 23. In step 24 the pressure is released and the disk is cooled. In step 24a air is allowed to reenter the cylinder 10. Optionally, this step may be performed after step 23. In step 25 a magnetic field is applied to the disk to set the servo pattern on the disk.

Figure 4A:
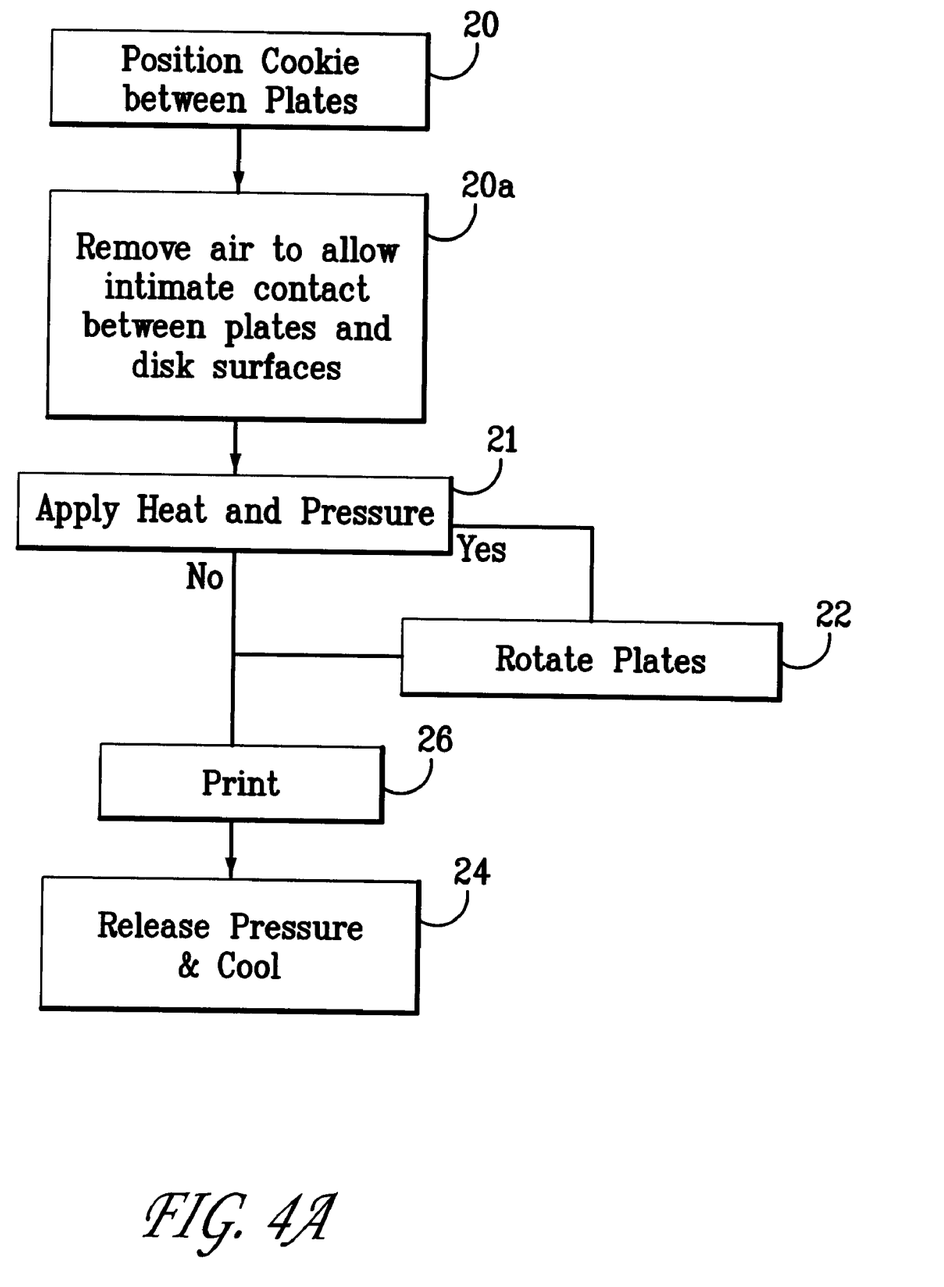
FIG. 4A depicts the steps of the process wherein the servo track is printed on the disks.
Figure 4B:
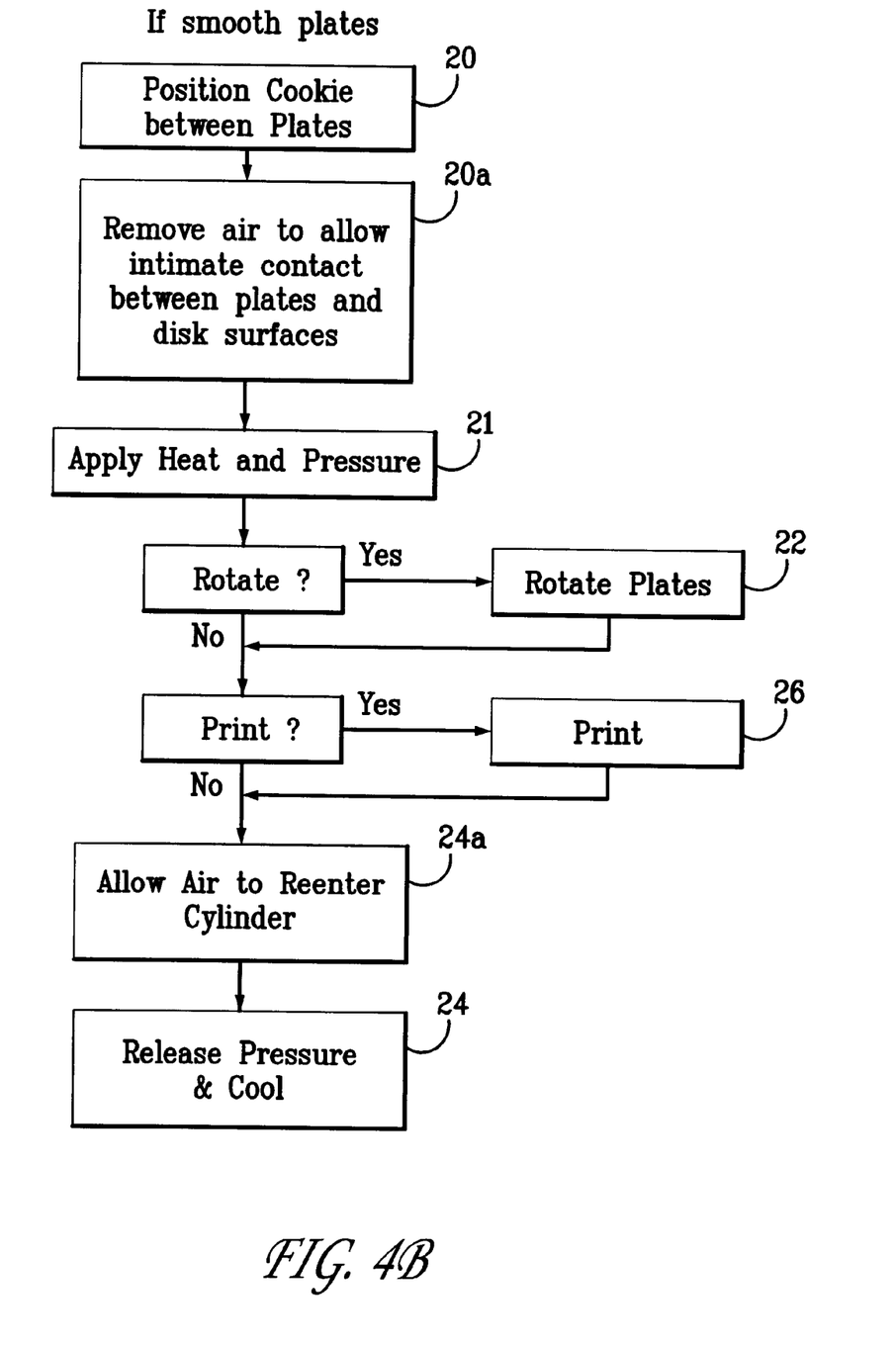
FIG. 4B depicts the steps of the process if smooth plates and a conventional servo writer are used.

FIG. 4A depicts the steps of the invention which are performed when a servo pattern is printed onto the disk. The steps of applying heat and pressure 21 and rotating the plates 22 are performed repetitively until there is no residual directional differences in the modulus of elasticity. Then the step 26 of printing the servo pattern on the disk is performed. FIG. 4B depicts of the process of the invention if smooth plates are used in the press. If the step 22, rotating the plates, is performed, it is performed with flat plates. Then the step 26 of printing the servo is performed with printing plates.

Figure 4C:
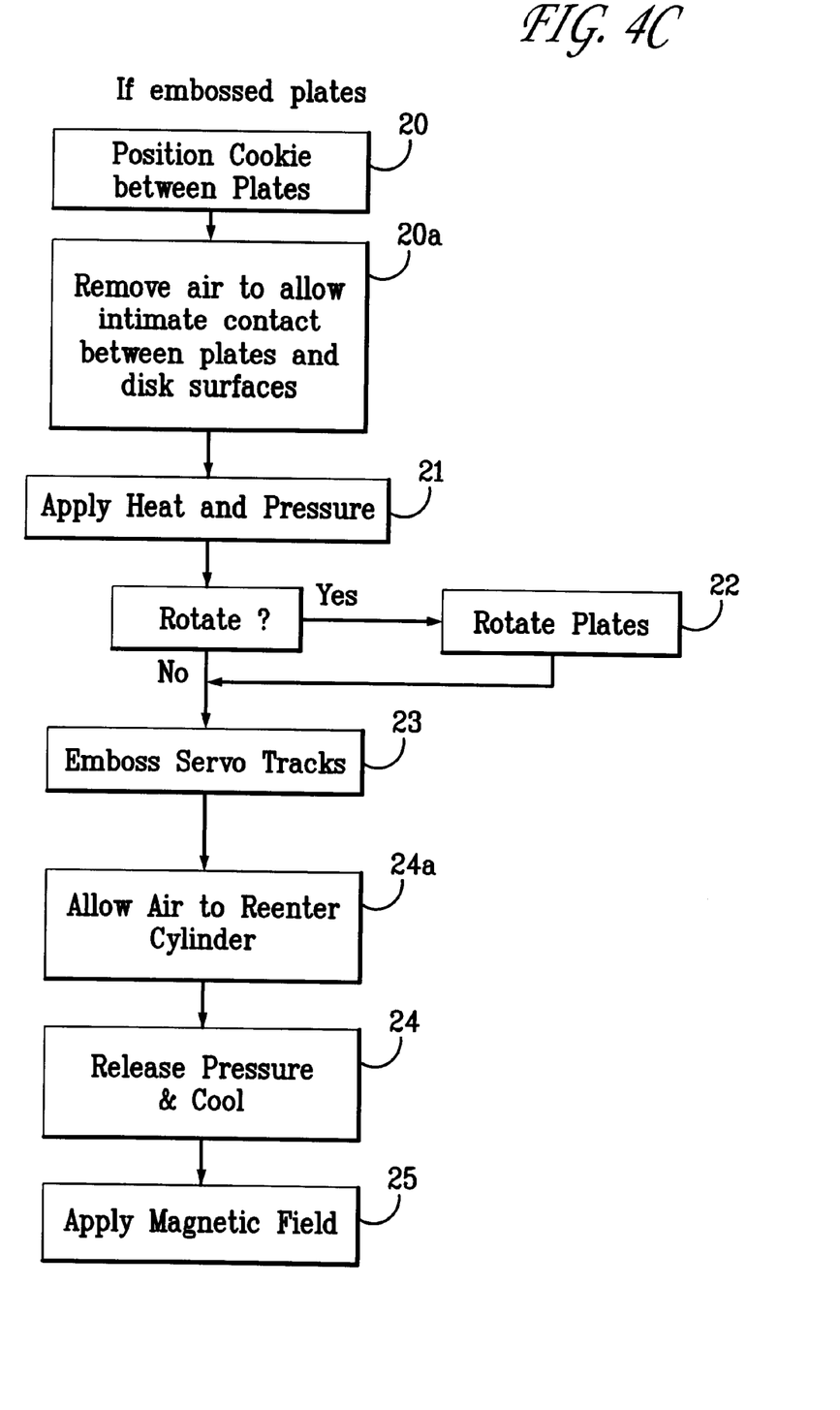
FIG. 4C depicts the steps of the invention if embossed plates for embossing the servo pattern are used.

FIG. 4C depicts the process of the invention when the servo pattern is embossed. If the step of rotating the plates is performed, it is performed with smooth flat plates. After all directional differences in modulus of elasticity are removed, the disk is embossed with servo tracks as indicated at step 23.

While a particular embodiments have been shown and described various modifications may be made. The appending clams are, therefore intended to cover such modifications within the true sprit and scope of the invention.

What is claimed is:

1. In a method of producing magnetic recording disks by the steps of applying a magnetic film forming material onto a substrate and forming said substrate into magnetic recording disks, the improved method of smoothing said disks comprising:

positioning at least one of said disks between flat plates, and increasing the temperature and pressure on said disk.

2. The method recited in claim 1 wherein said pressure is increased on said disk until the pressure approaches the yield strength of the said substrate.

3. The method recited in claim 1 wherein said temperature is increased to above the glass transition temperature of said substrate allowing local deformation with low residual stress.

4. The method recited in claim 1 further comprising:

embossing servo tracks on said disk with said flat plates.

5. The method recited in claim 1 wherein said magnetic film forming material is a liquid further comprising:

applying a magnetic field to the magnetic film forming liquid, and drying the magnetic film forming liquid.

6. The method recited in claim 1 further comprising:

rotating said flat plates, one with respect to the other, while said disk is under increased temperature and pressure.

7. The method recited in claim 1 further comprising:

printing servo tracks on said disk with said flat plates.

8. The method recited in claim 1 further comprising:

removing air from between said plates before increasing the temperature and pressure on said disk.

9. The method recited in claim 4 further comprising:

rotating said flat plates, one with respect to the other, while said disk is under increased temperature and pressure to remove directional differences in the modulus of elasticity of said disk, and thereafter embossing servo tracks on said disks with flat plates having an embossing pattern thereon.

10. The method recited in claim 7 further comprising:

rotating said flat plates, one with respect to the other, while said disk is under increased temperature and pressure to reduce axial differences in the modulus of elasticity of said disk, and thereafter printing servo tracks on said disk with flat plates having a printing pattern thereon.

* * * * *

UNITED STATES PATENT AND TRADEMARK OFFICE
CERTIFICATE OF CORRECTION

PATENT NO. : 6,432,346 B1  
DATED : August 13, 2002  
INVENTOR(S) : David Hall It is certified that error appears in the above-identified patent and that said Letters Patent is hereby corrected as shown below:

<u>Column 1,</u>
Line 30, "oft he" should be -- of the --

Signed and Sealed this

Eleventh Day of March, 2003

JAMES E. ROGAN  
*Director of the United States Patent and Trademark Office*